United States Patent [19]

Buding et al.

[11] Patent Number: 4,576,992

[45] Date of Patent: Mar. 18, 1986

[54] POLYMER MIXTURES

[75] Inventors: Hartmuth Buding, Dormagen; Heinrich Königshofen, Bergisch-Gladbach; Zsolt Szentivanyi; Joachim Thörmer, both of Leverkusen, all of Fed. Rep. of Germany

[73] Assignee: Bayer Aktiengesellschaft, Leverkusen-Bayerwerk, Fed. Rep. of Germany

[21] Appl. No.: 676,486

[22] Filed: Nov. 29, 1984

[30] Foreign Application Priority Data

Dec. 14, 1983 [DE] Fed. Rep. of Germany ....... 3345249

[51] Int. Cl.$^4$ .................... C08L 45/00; C08L 23/16
[52] U.S. Cl. .................... 525/211; 525/210; 525/232; 525/234; 525/387; 525/233
[58] Field of Search ............... 525/232, 233, 234, 210, 525/211, 236, 237

[56] References Cited

U.S. PATENT DOCUMENTS 4,404,329 9/1983 Maeda .............................. 525/329.2
4,421,884 12/1983 Oyama ................................ 525/234

*Primary Examiner*—Christopher A. Henderson
*Attorney, Agent, or Firm*—Connolly and Hutz

[57] ABSTRACT

Co-vulcanizates having good mechanical properties are obtained from mixtures of: (a) from 35 to 5%, by weight, of hydrocarbon elastomers; (b) from 65 to 95%, by weight, of nitrile group-containing elastomers having from 25 to 140 nitrile nitrogen atoms and less 12 double bonds per 1000 carbon atoms; by radical crosslinking.

4 Claims, No Drawings

POLYMER MIXTURES

BACKGROUND OF THE INVENTION

This invention relates to vulcanizable polymer mixtures comprising of substantially saturated hydrocarbon elastomers and substantially saturated nitrile group-containing elastomers and to the co-vulcanizates produced therefrom by peroxide cross-linking.

Substantially saturated hydrocarbon elastomers include, for example, ehtylene/propylene or ethylene/propylene/diene copolymers (EPM or EPDM), as well as butyl rubber and polyoctenamer. They have a maximum of one double bond for eight carbon atoms. EPM and, in particular, EPDM are preferred.

EPM and EPDM are high-quality rubbers which are resistant to heat, chemicals, steam and hot water. They are obtained by copolymerisation of ethylene, propylene and optionally a non-conjugated diene and may be cross-linked by means of peroxides, and also by means of sulphur in the case EPDM.

EPM and EPDM are described, for example, in "Rubber Chemistry and Technology", 45 (1972), 709–881.

Substantially saturated nitrile group-containing elastomers are obtained, for example by hydrogenation of nitrile rubbers (butadiene/acrylonitrile copolymers). Vulcanizates thereof are distinguished by high strength.

Such elastomers are known, for example from U.S. Pat. No. 3,700,637 and German Offenlegungsschrift No. 25 39 132.

SUMMARY OF THE INVENTION

It has now surprisingly been found that homogeneous mixtures may be produced from substantially saturated hydrocarbon elastomers and substantially saturated nitrile group-containing elastomers, which may be cross-linked by high energy radiation or, preferably, by peroxides to form co-vulcanizates having excellent properties.

DETAILED DESCRIPTION

The present invention therefore relates to mixtures comprising (a) from 35 to 5%, by weight, preferably from 20 to 10%, by weight, of substantially saturated hydrocarbon elastomers: (b) from 65 to 95%, by weight, preferably from 80 to 90%, by weight, of nitrile group-containing elastomers having from 25 to 140 nitrile nitrogen atoms per 1000 carbon atoms and less than 12 double bonds, preferably less than 3 double bonds, per 1000 carbon atoms; and also (c) conventional mixture additives; the percentages being based on the sum of (a) and (b).

The present invention also realtes to co-vulcanizates which are obtained from the above-mentioned mixtures by means of high energy radiation or, preferably, by peroxide cross-linking.

As monomer, in addition to ethylene and propylene, EPDM contains, for example, dicyclopentadiene or ethylidene norbornene.

Starting materials for the production of the substantially saturated nitrile group-containing elastomers preferably include nitrile rubbers of from 10 to 48%, by weight, (meth)acrylonitrile, from 50 to 85%, by weight, of a conjugated diene having from 4 to 9 carbon atoms and from 0 to 30%, by weight, of a third monomer, for example (meth)acrylic acid, (meth)acrylic acid alkyl ester or vinyl acetate, which are hydrogenated in accordance with DE-OS No. 25 39 132.

The nitrile rubbers preferably consist of from 48 to 15%, by weight, of acrylonitrile and from 52 to 85%, by weight, of butadiene or isoprene.

As known to those skilled in the art, conventional additives to rubber mixtures include, for example, fillers, plasticizers, anti-ageing agents, processing auxiliaries, pigments, acid-acceptors and vulcanization chemicals, peroxides being used for the vulcanization of the rubber mixture according to the present invention.

Suitable peroxides include, for example, dialkyl peroxides, ketal peroxides, aralkyl peroxides, peroxy ethers and peroxy esters.

Di-t-butyl peroxide, bis(t-butyl peroxyisopropyl-benzene), dicumyl peroxide, 2,5-dimethyl-2,5-di-(t-butyl-peroxy)-hexane, 2,5-dimethyl-2,5-di-(t-butyl-peroxy)-hexane-(3), 1,1-bis(t-butyl-peroxy)-3,3,5-trimethylcyclohexane, benzoyl peroxide, t-butylcumyl peroxide or t-butyl-perbenzoate are preferably used.

The quantities of peroxide used may be from 1 to 15%, by weight, preferably from 4 to 8%, by weight, based on rubber solids.

The co-vulcanizates are particularly stable in hot air and also exhibit minimal swelling in coolants, for example polyglycol ethers, and an excellent property level in the other essential rubber properties. They are therefore suitable for the production of packings and other rubber articles, in particular for applications having specific requirements.

EXAMPLE

The following mixtures (parts, by weight) were produced on a laboratory roller heated to 50° C. Plates measuring 100×100×2 mm were produced therefrom, vulcanized at 180° C. for 15 minutes and tempered at 150° C. for 17 hours.

Some S 2 rods according to DIN No. 53 504, on which the properties indicated below were measured, were punched from the plates.

Polymer I is a hydrogenated acrylonitrile/butadiene copolymer having an acrylonitrile content of 34%, by weight, a degree of hydrogenation of 99% and a Mooney viscosity ML 100° C. (1+4) of 70 ME.

Polymer II is an ethylene/propylene/ethylidene norbornene terpolymer containing 48%, by weight, propylene and 50%, by weight, ethylene and having a Mooney viscosity ML4/100° C. of 70.

Polymer III is an ethylene/propylene copolymer having a propylene content of 50%, by weight, and a Mooney viscosity ML4/100° C. of 45.

Polymer IV is a polyoctenamer having a Mooney viscosity ML 1+4/60° C. of 12 and ML 1+4/100° C. of 5.

Polymer V is a butyl rubber having a content of incorporated isoprene of 2%, by weight, and a Mooney viscosity ML 1+8/100° C. of 48.

|  | A | B | C | D | E | F | G | H | I | K | L |
|---|---|---|---|---|---|---|---|---|---|---|---|
| Mixture |  |  |  |  |  |  |  |  |  |  |  |
| Polymer I | 100 | 90 | 80 | 65 | 50 | — | 90 | 80 | 65 | 50 | — |
| Polymer II | — | 10 | 20 | 35 | 50 | 100 | — | — | — | — | — |

-continued

| | | | | | | | | | | | |
|---|---|---|---|---|---|---|---|---|---|---|---|
| Polymer III | — | — | — | — | — | — | 10 | 20 | 35 | 50 | 100 |
| Steric acid | 0.75 | 0.75 | 0.75 | 0.75 | 0.75 | 0.75 | 0.75 | 0.75 | 0.75 | 0.75 | 0.75 |
| Magnesium oxide | 6.5 | 6.5 | 6.5 | 6.5 | 6.5 | 6.5 | 6.5 | 6.5 | 6.5 | 6.5 | 6.5 |
| Zinc oxide, active | 3.5 | 3.5 | 3.5 | 3.5 | 3.5 | 3.5 | 3.5 | 3.5 | 3.5 | 3.5 | 3.5 |
| Styrenized diphenylamine | 1.1 | 1.1 | 1.1 | 1.1 | 1.1 | 1.1 | 1.1 | 1.1 | 1.1 | 1.1 | 1.1 |
| Zinc salt of mercaptobenzimidazole | 0.4 | 0.4 | 0.4 | 0.4 | 0.4 | 0.4 | 0.4 | 0.4 | 0.4 | 0.4 | 0.4 |
| Carbon black N762 | 50 | 50 | 50 | 50 | 50 | 50 | 50 | 50 | 50 | 50 | 50 |
| Triallyl isocyanurate | 1.75 | 1.75 | 1.75 | 1.75 | 1.75 | 1.75 | 1.75 | 1.75 | 1.75 | 1.75 | 1.75 |
| Bis-(t-butyl-peroxy-isopropyl)benzene | 7.5 | 7.5 | 7.5 | 7.5 | 7.5 | 7.5 | 7.5 | 7.5 | 7.5 | 7.5 | 75. |
| Properties | | | | | | | | | | | |
| Tensile Strength [MPa] | 17.5 | 19.6 | 19.0 | 17.9 | 15.0 | 10.9 | 17.8 | 17.3 | 15.9 | 14.5 | 9.5 |
| Breaking Elongation [%] | 290 | 315 | 290 | 300 | 250 | 220 | 290 | 270 | 255 | 240 | 250 |
| Tension Value [MPa] | 8.2 | 8.3 | 8.2 | 8.2 | 7.8 | 5.6 | 7.6 | 7.4 | 8.0 | 7.7 | 3.9 |
| Shore-A-Hardness | 75 | 76 | 76 | 76 | 76 | 73 | 76 | 75 | 76 | 77 | 73 |

| | | M | N | O | P | Q | R | S | T |
|---|---|---|---|---|---|---|---|---|---|
| | Mixture | | | | | | | | |
| | Polymer I | 90 | 80 | 65 | 50 | 90 | 80 | 65 | 50 |
| | Polymer IV | 10 | 20 | 35 | 50 | — | — | — | — |
| | Polymer V | — | — | — | — | 10 | 20 | 35 | 50 |
| | Stearic acid | 0.75 | 0.75 | 0.75 | 0.75 | 0.75 | 0.75 | 0.75 | 0.75 |
| | Magnesium oxide | 6.5 | 6.5 | 6.5 | 6.5 | 6.5 | 6.5 | 6.5 | 6.5 |
| | Zinc oxide, active | 3.5 | 3.5 | 3.5 | 3.5 | 3.5 | 3.5 | 3.5 | 3.5 |
| | Styrenised diphenylamine | 1.1 | 1.1 | 1.1 | 1.1 | 1.1 | 1.1 | 1.1 | 1.1 |
| | Zinc salt of mercaptobenzimidazole | 0.4 | 0.4 | 0.4 | 0.4 | 0.4 | 0.4 | 0.4 | 0.4 |
| | Carbon black N762 | 50 | 50 | 50 | 50 | 50 | 50 | 50 | 50 |
| | Triallyl isocyanurate | 1.75 | 1.75 | 1.75 | 1.75 | 1.75 | 1.75 | 1.75 | 1.75 |
| | Bis-(t-butyl peroxy-isopropyl)-benzene | 7.5 | 7.5 | 7.5 | 7.5 | 7.5 | 7.5 | 7.5 | 7.5 |
| | Properties | | | | | | | | |
| | Tensile Strength [MPa] | 17.1 | 17.1 | 15.8 | 14.9 | 16.8 | 15.3 | 11.0 | 5.6 |
| | Breaking Elongation [%] | 310 | 350 | 340 | 320 | 310 | 280 | 210 | 125 |
| | Tension Value [MPa] | 7.3 | 6.6 | 7.3 | 7.2 | 6.4 | 6.7 | 6.2 | 5.0 |
| | Shore-A-Hardness | 75 | 74 | 77 | 78 | 73 | 71 | 67 | 62 |

We claim:

1. Mixtures comprising (a) from 35 to 5%, by weight, of substantially saturated hydrocarbon elastomers selected from EPM, EPDM, butyl rubber or polyoctenamer; (b) from 65 to 95%, by weight, of a nitrile group-containing elastomer having from 25 to 140 nitrile nitrogen atoms and less than 12 double bonds per 1000 carbon atoms; and also (c) conventional mixture additives; the percentages being based on the sum of (a) and (b).

2. Mixtures according to claim 1 of from 20 to 10%, by weight, of (a) and from 80 to 90%, by weight, of (b).

3. Mixtures according to claim 1 wherein (b) contains less than 3 double bonds per 1000 carbon atoms.

4. A mixture according to claim 1 wherein (a) is EPM or EPDM.

* * * * *